(12) United States Patent
Cho et al.

(10) Patent No.: US 12,073,012 B2
(45) Date of Patent: Aug. 27, 2024

(54) DISPLAY DEVICE RETREIVING MULTIPATH CHANNEL CHARACTERISTIC DATA OF WIRELESS SIGNAL AND METHOD OF CONTROLLING THE SAME

(71) Applicant: SAMSUNG ELECTRONICS CO., LTD., Suwon-si (KR)

(72) Inventors: Kyuhyun Cho, Suwon-si (KR); Eungsik Yoon, Suwon-si (KR); Heeseok Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/960,607

(22) Filed: Oct. 5, 2022

(65) Prior Publication Data

US 2023/0060649 A1    Mar. 2, 2023

Related U.S. Application Data

(63) Continuation of application No. PCT/KR2022/011356, filed on Aug. 2, 2022.

(30) Foreign Application Priority Data

Sep. 1, 2021    (KR) .................. 10-2021-0116054

(51) Int. Cl.
*G06F 3/01*    (2006.01)
*G09G 5/00*    (2006.01)

(52) U.S. Cl.
CPC ............ *G06F 3/011* (2013.01); *G09G 5/003* (2013.01); *G09G 2354/00* (2013.01); *G09G 2370/16* (2013.01)

(58) Field of Classification Search
CPC ...... G06F 1/3231; G06F 1/3265; G06F 3/011; G09G 2330/021; G09G 2354/00;
(Continued)

(56) References Cited

U.S. PATENT DOCUMENTS 10,291,460 B2    5/2019    Zhang et al.
2014/0015706 A1    1/2014    Ishihara et al.
(Continued)

FOREIGN PATENT DOCUMENTS

JP    2020-144115    9/2020
KR    10-2016-0052319    5/2016
(Continued)

OTHER PUBLICATIONS

Wei Wang et al., "Device-free Human Activity Recognition Using Commercial WiFi Devices", IEEE Journal on Selected Areas in Communications, vol. 35, Issue No. 5, Mar. 9, 2017, 13 pp.
(Continued)

*Primary Examiner* — Richard J Hong
(74) *Attorney, Agent, or Firm* — Nixon & Vanderhye P.C.

(57) ABSTRACT

A display device and a method of controlling the same are provided. According to various example embodiments, the display device may include: a communicator comprising communication circuitry configured to receive a wireless signal transmitted by a wireless router, and a processor configured to: retrieve multipath channel characteristic data based on the wireless signal, generate similarity data representing a similarity for each time period of the multipath channel characteristic data, adjust a threshold based on the similarity data, and increasing the threshold based on the similarity data based on the environmental indicator having appeared, measure a motion around the display device based on a comparison result between the similarity data and the threshold, and control the display device based on the motion within a specified range of the display device.

20 Claims, 13 Drawing Sheets

(58) Field of Classification Search
CPC .... G09G 2370/16; G09G 5/003; H04B 17/23;
G01S 7/415; G01S 13/87; G01S 13/765;
G01S 5/017; G01S 13/50; H04W 4/029;
H04W 48/16

See application file for complete search history.

(56) References Cited

U.S. PATENT DOCUMENTS

| | | | |
|---|---|---|---|
| 2017/0090026 A1* | 3/2017 | Joshi | G01S 13/87 |
| 2017/0160428 A1 | 6/2017 | Kumar | |
| 2018/0183650 A1 | 6/2018 | Zhang et al. | |
| 2018/0351775 A1* | 12/2018 | Zhang | G01S 13/50 |
| 2019/0327124 A1* | 10/2019 | Lai | G01S 5/017 |
| 2020/0064456 A1* | 2/2020 | Xu | G01S 13/765 |
| 2020/0182995 A1 | 6/2020 | Zeng et al. | |
| 2020/0202117 A1* | 6/2020 | Wu | H04W 4/029 |
| 2020/0319324 A1* | 10/2020 | Au | H04W 48/16 |
| 2021/0091866 A1 | 3/2021 | Zhang et al. | |
| 2021/0173045 A1* | 6/2021 | Hu | G01S 7/415 |

FOREIGN PATENT DOCUMENTS

| | | |
|---|---|---|
| KR | 10-2021-0077516 | 6/2021 |
| KR | 10-2021-0092614 | 7/2021 |
| KR | 10-2290857 | 8/2021 |

OTHER PUBLICATIONS

Search Report dated Oct. 28, 2022 issued in International Patent Application No. PCT/KR2022/011356.

Extended European Search Report dated May 22, 2024 for EP Application No. 22864887.9.

* cited by examiner

DISPLAY DEVICE RETREIVING MULTIPATH CHANNEL CHARACTERISTIC DATA OF WIRELESS SIGNAL AND METHOD OF CONTROLLING THE SAME

CROSS-REFERENCE TO RELATED APPLICATIONS

This application is a continuation of International Application No. PCT/KR2022/011356 designating the United States, filed on Aug. 2, 2022, in the Korean Intellectual Property Receiving Office and claiming priority to Korean Patent Application No. 10-2021-0116054, filed on Sep. 1, 2021, in the Korean Intellectual Property Office, the disclosures of which are incorporated by reference herein in their entireties.

BACKGROUND

1. Field

The disclosure relates to a display device and method of controlling the same.

2. Description of Related Art

Recently, a display device may provide various network environments, such as wired Ethernet, a wireless local area network (LAN), and Bluetooth. A user of the display device may connect to the Internet or to a surrounding device, and may display content of the surrounding device on the display device. The wireless LAN may provide a wireless fidelity (Wi-Fi) function. Channel state information (CSI) of Wi-Fi may represent a channel frequency response by an orthogonal frequency division multiplexing (OFDM) subcarrier, and may include information on deformation of a signal between transmitting and receiving, such as decay, diffraction, and reflection.

SUMMARY

According to various example embodiments, a display device includes: a communicator comprising communication circuitry configured to receive a wireless signal transmitted by a wireless router, and a processor configured to: retrieve multipath channel characteristic data based on the wireless signal, generate similarity data representing a similarity for each time period of the multipath channel characteristic data, adjust a threshold based on the similarity data, and increasing the threshold based on the similarity data based on the environmental indicator having appeared, measure a motion around the display device based on a comparison result between the similarity data and the threshold, and control the display device based on the motion around the display device.

According to various example embodiments, a display device includes: a processor, and a memory configured to store instructions executable by the processor, wherein, in response to the instructions being executed by the processor, the processor may be configured to: retrieve multipath channel characteristic data based on a wireless signal transmitted by a wireless router, generate similarity data representing a similarity for each time period of the multipath channel characteristic data, adjust a threshold based on the similarity data, and increasing the threshold based on the similarity data based on the environmental indicator having appeared, measure a motion around the display device based on a comparison result between the similarity data and the threshold, and control the display device based on the motion around the display device, wherein the environmental indicator may indicate physical manipulation by the user.

According to various example embodiments, a method of controlling a display device includes: retrieving multipath channel characteristic data based on a wireless signal transmitted by a wireless router, generating similarity data representing a similarity for each time period of the multipath channel characteristic data, adjusting a threshold based on the similarity data, and increasing the threshold based on the similarity data based on the environmental indicator having appeared, measuring a motion around the display device based on a comparison result between the similarity data and the threshold, and controlling the display device based on the motion around the display device.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
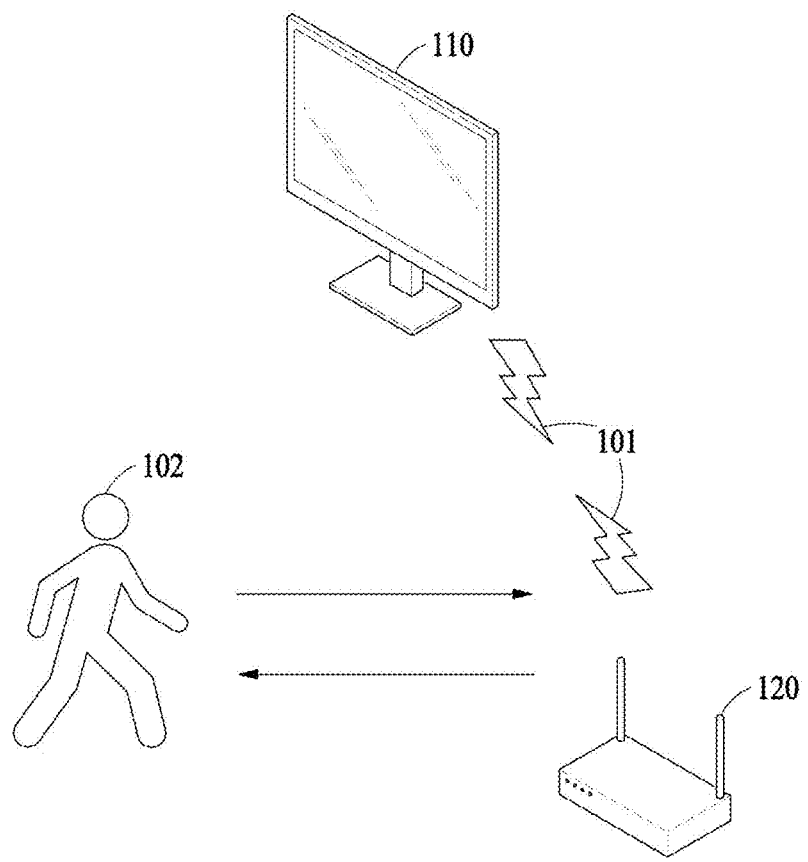
FIG. 1 is a diagram illustrating an example of a communication environment between a display device and a wireless router according to various embodiments.

Hereinafter, various example embodiments will be described in greater detail with reference to the accompanying drawings. When describing the example embodiments with reference to the accompanying drawings, like reference numerals refer to like elements and a repeated description related thereto may not be provided.

A motion may be measured from multipath channel characteristic data, however, the measurement accuracy may be deteriorated in case a threshold used for a determination criterion does not have an appropriate value.

The measurement accuracy may be improved by maintaining a threshold at an appropriate value when measuring a motion using multipath channel characteristic data.

FIG. 1 is a diagram illustrating an example communication environment between a display device and a wireless router according to various embodiments. Referring to FIG. 1, a wireless router 120 may be located near a display device 110, and wireless communication may be performed between the display device 110 and the wireless router 120 through a wireless signal 101. The wireless router 120 may include wired Internet connection, and may connect the display device 110 to the Internet using wired Internet connection and wireless communication connection. The wireless communication may include wireless fidelity (Wi-Fi), and the wireless signal 101 may be a Wi-Fi signal.

The display device 110 may retrieve multipath channel characteristic data based on the wireless signal 101, and may control the display device 110 using the multipath channel characteristic data. The multipath channel characteristic data may represent a channel status characteristic of a multipath. For example, the multipath channel characteristic data may include channel status information (CSI) data. The display device 110 may measure a motion around the display device 110 using the multipath channel characteristic data, and may control the display device 110 based on the measured motion. For example, when there is no motion around the display device 110, the display device 110 may set a power mode of the display device 110 to a power saving mode.

Figure 2:
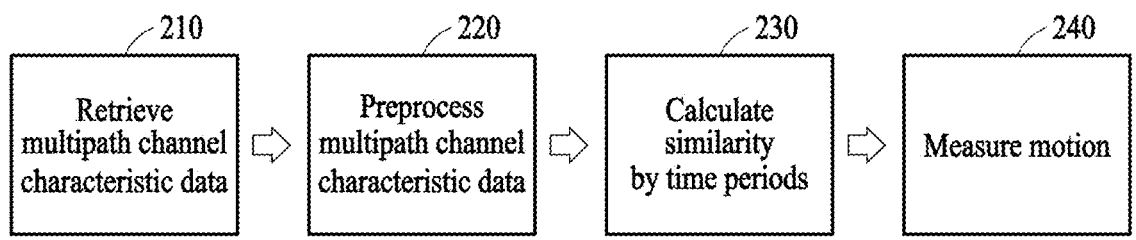
FIG. 2 is a diagram illustrating an example operation related to measuring a motion using multipath channel characteristic data according to various embodiments.

In case a user 102 uses the display device 110, for example, the user 102 is watching video content on the display device 110, a motion may be detected around the display device 110. On the other hand, in case the user 102 does not use the display device 110, a motion around the display device 110 may not be detected. In this case, unnecessary power consumption may be reduced by operating the display device 110 in the power saving mode or shutting off the power of the display device 110 For example, the power saving mode may include at least one of reducing brightness of a screen of the display device 110, reducing a volume level of the display device 110, turning off the screen of the display device 110, muting the sound of display device 110, and shutting off the power of the display device 110. FIG. 2 is a diagram illustrating example operations related to measuring a motion using multipath channel characteristic data according to various embodiments. Referring to FIG. 2, in operation 210, a display device (for example, the display device 110, a display device 1200, and a display device 1300) may retrieve multipath channel characteristic data. The display device may retrieve the multipath channel characteristic data based on a wireless signal transmitted by a wireless router (for example, the wireless router 120). The wireless signal may be a Wi-Fi signal.

The multipath channel characteristic data may represent a channel frequency response by an orthogonal frequency division multiplexing (OFDM) subcarrier. The display device may retrieve the multipath channel characteristic data from a response signal of the wireless router to a response request signal of the display device, and may extract an amplitude for a frequency of each subcarrier from the multipath channel characteristic data.

In operation 220, the display device may perform preprocessing on the multipath channel characteristic data. For example, the preprocessing may include at least one of removing a data gap of a frequency, which does not have an amplitude value, among the frequencies of subcarriers, and removing an outlier from amplitude data.

In operation 230, the display device may calculate a similarity for each time period of the multipath channel characteristic data based on amplitude data for each frequency of a subcarrier based on the multipath channel characteristic data. The multipath channel characteristic data may be divided by time periods, and the similarity by the time periods may represent a similarity between multipath channel characteristic data of adjacent periods. For example, the similarity by the time period may include an autocorrelation function (ACF). In case the preprocessing is performed through operation 220, the display device may calculate a similarity based on a result of the preprocessing. The display device may determine representative values for each reference time through similarity calculation, and here, the reference time may correspond to one of sampling time points (for example, a time point when a response signal is received) of the multipath channel characteristic data.

For example, the display device may determine a first similarity value of a first frequency at a W+1-th time point by calculating a similarity between first amplitude data of the first frequency at a first time point to a W-th time point within a first window and second amplitude data of the first frequency at a second time point to the W+1-th time point within a second window. The display device may determine similarity values of other frequencies, such as a second frequency, in a similar manner. The display device may determine a representative value at the W+1-th time point, based on the first similarity value of the first frequency at the W+1-th time point and a second similarity value of the second frequency at the W+1-th time point. For example, the representative value may correspond to a statistical value (for example, an average value) of the similarity values. The display device may determine representative values at other time points, such as a W+2-th time point, in a similar manner.

Similarity data may be generated as a result of a similarity calculation. The similarity data may represent representative values over time. The similarity data may represent a change in a pattern of the multipath channel characteristic data. The multipath channel characteristic data may represent a pattern corresponding to a surrounding environment, and the similarity data may represent a change in the pattern of the multipath channel characteristic data. Accordingly, a change in the surrounding environment may be detected through the similarity data.

In operation 240, the display device may measure a motion around the display device. The display device may measure the motion based on a comparison result between the similarity data and a threshold. For example, the display device may determine that there is a motion in a period in which the similarity data is greater than the threshold, and may determine that there is no motion in a period in which the similarity data is less than the threshold. The display device may adaptively adjust the threshold based on the similarity data and an environmental indicator. The environmental indicator may be a clue that indicates a high probability of the presence of a user other than the multipath channel characteristic data. For example, the environmental indicator may indicate physical manipulation by the user, and may include at least one of a remote controller signal, an infrared (IR) signal, an ultrawide band (UWB) signal, input speech, and additional physical connection. The display device may control the display device based on the measured motion.

Figure 3:
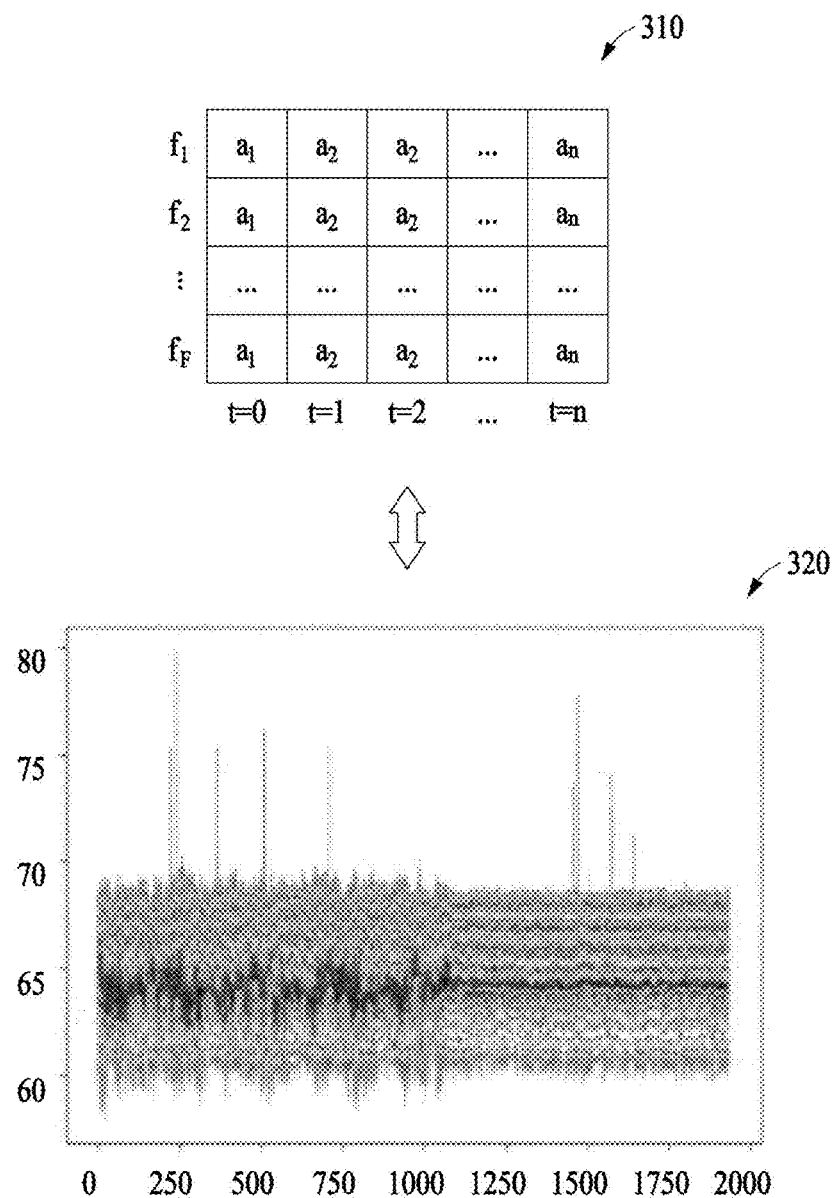
FIG. 3 is a diagram illustrating an example of amplitude data based on multipath channel characteristic data according to various embodiments.

FIG. 3 is a diagram illustrating example amplitude data based on multipath channel characteristic data according to various embodiments. The amplitude data may represent an amplitude for a frequency at each reference time. A display device (for example, the display device 110, the display device 1200 (refer to FIG. 12), and the display device 1300 (refer to FIG. 13)) may retrieve the multipath channel characteristic data at each reference time, and may generate the amplitude data by extracting an amplitude for each frequency from the multipath channel characteristic data. The amplitude data may have a data structure as shown in Table 310. $f_i$ may denote a frequency of a subcarrier having an index i, n may denote a size of a window for calculating a similarity, and a may denote an amplitude. t may have a value between 1 to F. F may denote a total number of subcarriers. t may denote a reference time. For example, a1 may denote an amplitude of multipath channel characteristic data retrieved at a reference time t=0. The amplitude data may be represented by graph 320. In graph 320, the horizontal axis may represent time and the vertical axis may represent amplitude. In graph 320, each frequency may be discriminated from another by color.

Figure 4:
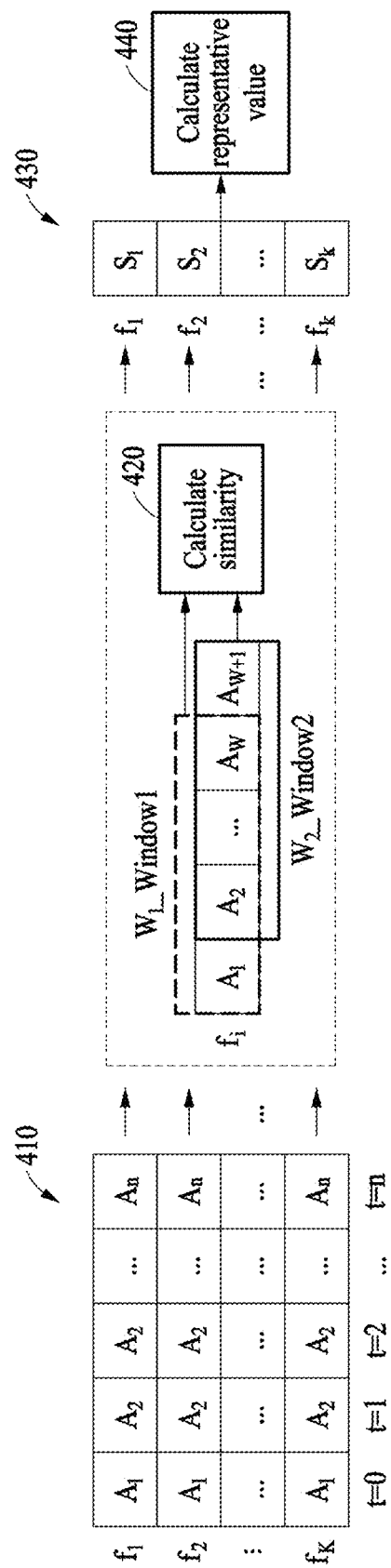
FIG. 4 is a diagram illustrating an example operation of deriving representative values for each reference time, according to various embodiments.

FIG. 4 is a diagram illustrating example operations of deriving representative values at each reference time. Referring to FIG. 4, similarity values 430 may be derived by operation 420 of calculating a similarity based on amplitude data 410. In the amplitude data 410, A may denote an amplitude, and k may denote a total number of subcarriers. The amplitude data 410 may correspond to a result of preprocessing, and in case a data gap is removed through preprocessing, k may be less than F. As described above with reference to FIG. 4, F may denote a total number of subcarriers before preprocessing.

The similarity values 430 of each frequency with respect to a W+1-th reference time may be derived by performing operation 420 on each of the frequencies of the amplitude data 410 at the W+1-th reference time. Each frequency may be represented by $f_i$. i may have a value between 1 to k. For an i-th amplitude data of $f_i$, a first window $W_1$ and a second window $W_2$ may be defined, and an i-th similarity value $S_i$ may be determined through operation 420 between amplitude data $A_1$ to $A_W$ of the first window $W_1$ and amplitude data $A_2$ to $A_{W+1}$ of the second window $W_2$.

As described with reference to FIG. 3, n may denote a size of a window for operation 420. When n+1 times of data retrieval have performed before operation 420, amplitude data $A_1$ to $A_n$ of $f_i$ may configure the amplitude data $A_1$ to $A_W$ of the first window $W_1$, and amplitude data $A_2$ to $A_{n+1}$ may configure the amplitude data $A_2$ to $A_{W+1}$ of the second window $W_2$. By performing operation 420 between the amplitude data $A_1$ to $A_W$ of $f_i$ and the amplitude data $A_2$ to $A_{W+1}$ of $f_i$, the i-th similarity value $S_i$ at the W+1-th reference time may be determined.

As the first similarity value $S_1$ at the W+1-th reference time to a k-th similarity value $S_k$ at the W+1-th reference time are determined, operation 440 of calculating a representative value may be performed based on a statistical value of the similarity values $S_1$ to $S_k$. For example, based on an average value of the similarity values $S_1$ to $S_k$ at the W+1-th reference time, a representative value at the W+1-th reference time may be determined. Through the operations, a representative value for each reference time may be determined.

Figure 5:
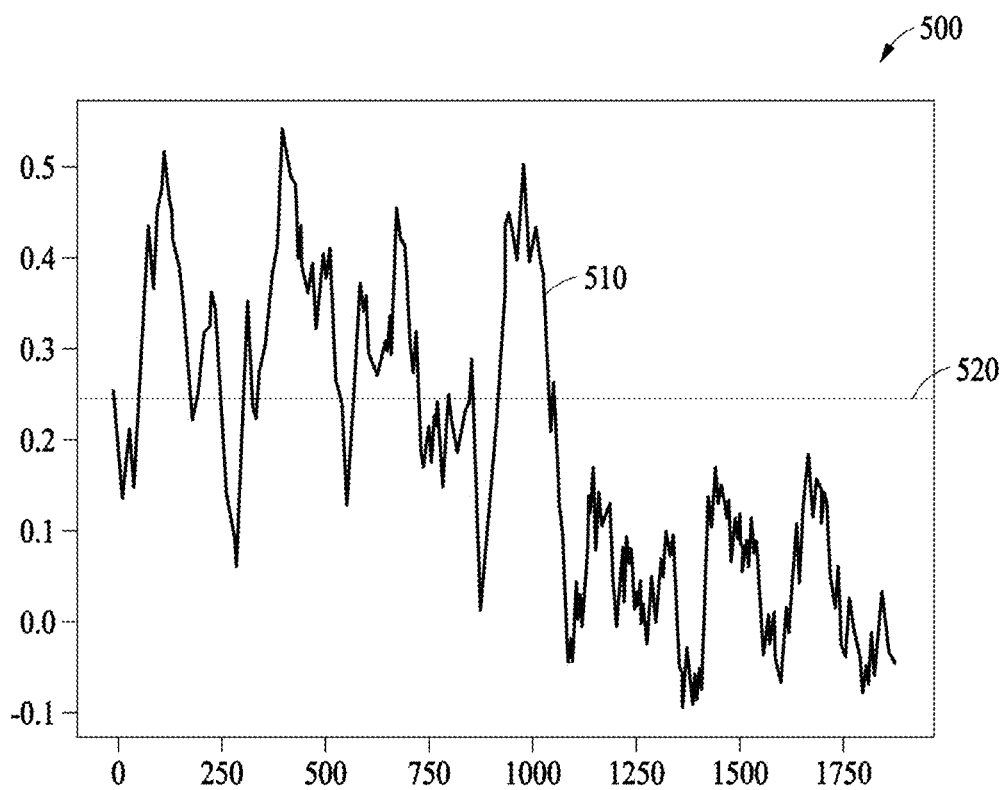
FIG. 5 is a graph illustrating an example operation of measuring a motion, according to various embodiments.

FIG. 5 is a graph illustrating an example operation of measuring a motion, according to various embodiments. Referring to FIG. 5, similarity data 510 and a threshold 520 are shown on graph 500. The similarity data 510 may represent representative values over time. In graph 500, the horizontal axis may represent time and the vertical axis may represent a similarity value. The similarity data 510 may vary over time. A motion around a display device (for example, the display device 110, the display device 1200, and the display device 1300) may change a pattern of multipath channel characteristic data, and a value of the similarity data 510 may increase thereby. The display device may measure the motion based on a comparison result between the similarity data 510 and the threshold 520. For example, the display device may determine that there is a motion in a period in which the similarity data 510 is greater than the threshold 520, and may determine that there is no motion in a period in which the similarity data 510 is less than the threshold 520. The display device may adaptively adjust the threshold 520, based on the similarity data 510 and an environmental indicator.

Figure 6:
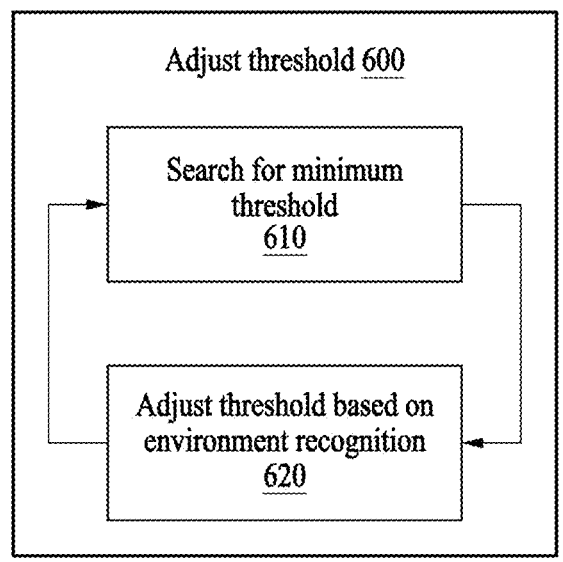
FIG. 6 is a diagram illustrating an example operation of adjusting a threshold, according to various embodiments.

FIG. 6 is a diagram illustrating an example operation of adjusting a threshold according to various embodiments. Since the threshold is used as a criterion for determining motion measurement, the measurement accuracy may decrease in case the threshold does not have an appropriate value. Using a fixed threshold may cause a difficulty in responding to a change in the environment, and thus, the accuracy may decrease based on time used. Even in case a user directly sets the threshold, repeated resetting processes by the user may be required, and the accuracy may also decrease. According to example embodiments, a display device (for example, the display device 110, the display device 1200, and the display device 1300) may maintain the threshold to be an appropriate value, based on the similarity data and the environmental indicator, and thus, the measurement accuracy may be improved.

Referring to FIG. 6, operation 600 of adjusting a threshold may include operation 610 of searching for a minimum threshold and operation 620 of adjusting the threshold based on environment recognition. Operation 610 may maintain a state of sensitive response to a motion of a user while continuously decreasing the threshold. For example, in the initial connection of a product (for example, a display device), a threshold of the product may be set to an initial value. Operation 610 may continuously adjust the threshold from the initial value to a lower value during a situation that no user is present. Operation 610 may be performed for a considerable time (for example, a day, multiple days, a week) in response to the situation that no user is present, and thus, the threshold may be set to a possible minimum value during the situation that no user is present.

Figure 7:
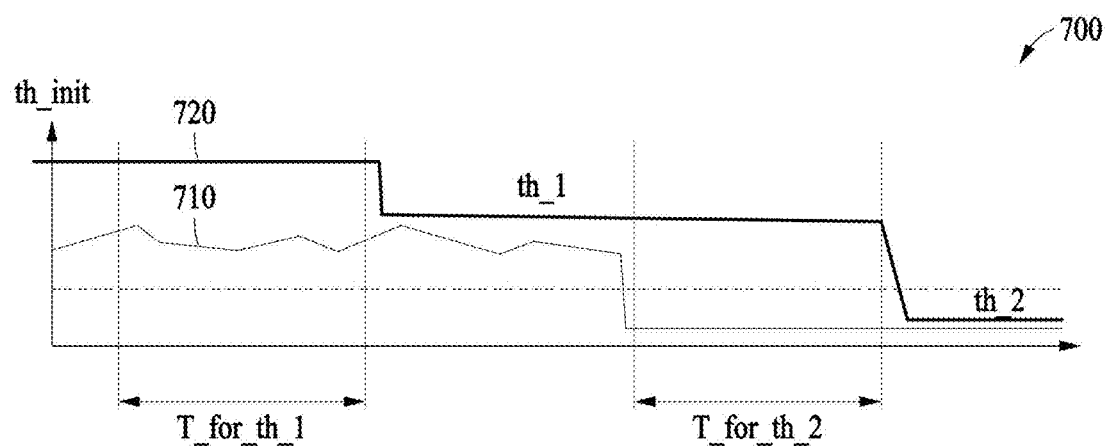
FIG. 7 is a graph illustrating an example operation of searching for a minimum threshold, according to various embodiments.

FIG. 7 is a graph illustrating an example operation of searching for a minimum threshold according to various embodiments. Referring to FIG. 7, graph 700 may show similarity data 710 and a threshold 720. The threshold 720 may initially have an initial value th_init. When a representative similarity value of a first time period T_for_th_1, on which an operation of searching for the minimum threshold is performed, is less than the threshold 720, the threshold 720 may decrease to a first value th_1. The first value th_1 may be a value between a maximum similarity value of the first time period T_for_th_1 and the threshold 720 having the initial value th_init.

The representative similarity value may be one of an average similarity value, a median similarity value, and a sampled similarity value of the first time period T_for_th_1.

The average similarity value may be an average value of similarity values based on the similarity data 710 of the first time period T_for_th_1, the median similarity value may be a median value of the similarity values based on the similarity data 710 of the first time period T_for_th_1, and the sampled similarity value may be a sampled value from the similarity values based on the similarity data 710 of the first time period T_for_th_1. The maximum similarity value may be a maximum value of the similarity values based on the similarity data 710 of the first time period T_for_th_1.

When a representative similarity value of a second time period T_for_th_2, on which the operation of searching for the minimum threshold is performed, is less than the threshold 720, the threshold 720 may further decrease to a second value th_2. The second value th_2 may be a value between a maximum similarity value of the second time period T_for_th_2 and the threshold 720 having the first value th_1. By repeating this process, the threshold 720, which is close to a state in which there is no motion while no user is present, may be obtained.

A time period T_for_th used for searching for the minimum threshold, such as the first time period T_for_th_1 and the second time period T_for_th_2, may have a predetermined time length. The operation of searching for the minimum threshold may be selectively performed when the reliability of the similarity data 710 is high. In case the reliability of the similarity data 710 of a time period T_for_th_k is not high, the similarity data 710 of the time period T_for_th_k may be discarded, and an operation of adjusting the threshold using the similarity data 710 of the time period T_for_th_k may not be performed. In case the similarity data 710 with high reliability at a predetermined time period T_for_th_k+1, after the time period T_for_th_k, is secured, the operation of adjusting the threshold may be performed based on the similarity data 710. The high reliability of the similarity data 710 of the time period T_for_th_k may represent that a distribution of the similarity data 710 of the time period T_for_th_k is stable. For example, when a standard deviation of the similarity data 710 is less than a threshold, the reliability of the similarity data 710 may be determined to be high.

Referring to FIG. 6, a minimum threshold may be derived through operation 610, however, a situation may occur in which similarity data is maintained to be greater than the threshold when there is no user motion due to a change in a state (for example, degradation) of a wireless router (for example, the wireless router 120) and/or a change in the surrounding environment. In this case, a motion may be detected even though there is no motion.

Operation 620 may prevent and/or avoid the situation by decreasing the threshold when an environmental indicator that informs a presence of a user has appeared. The environmental indicator may be a clue that indicates a high probability of the presence of a user other than the multipath channel characteristic data. For example, the environmental indicator may represent physical manipulation by the user, and may include at least one of a remote controller signal, an acceleration sensor signal, an IR signal, a UWB signal, input speech, and additional physical connection.

The remote controller signal may be generated as the user manipulates a remote controller of the display device. The remote controller may include an acceleration sensor, and an acceleration sensor signal that represents user manipulation as the user manipulates the remote controller may be generated. The IR signal and the UWB signal may appear as the user manipulates a device other than the display device. The input speech may occur as the user performs a speech input to the display device and/or another device. The additional physical connection may be detected as the user physically (for example, using a physical cable) connects another device to the display device.

Appearance of the environmental indicator, for example, detection of a remote controller signal as the user manipulates the display device by a remote controller, may provide a solid clue that a user is present. By adjusting the threshold using the similarity data of a situation in which the environmental indicator is detected, an accurate criterion for determining whether an actual user is present may be provided.

Figure 8A:
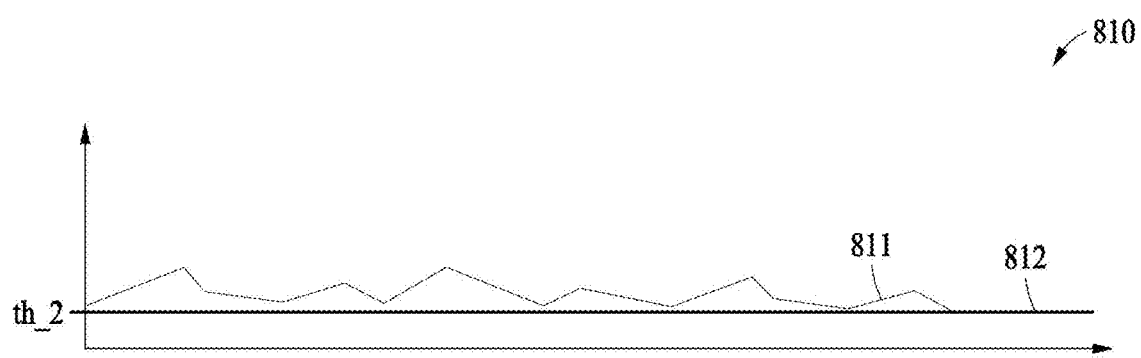
FIGS. 8A, 8B and 8C are graphs illustrating an example operation of adjusting a threshold based on environment recognition according to various embodiments.
Figure 8B:
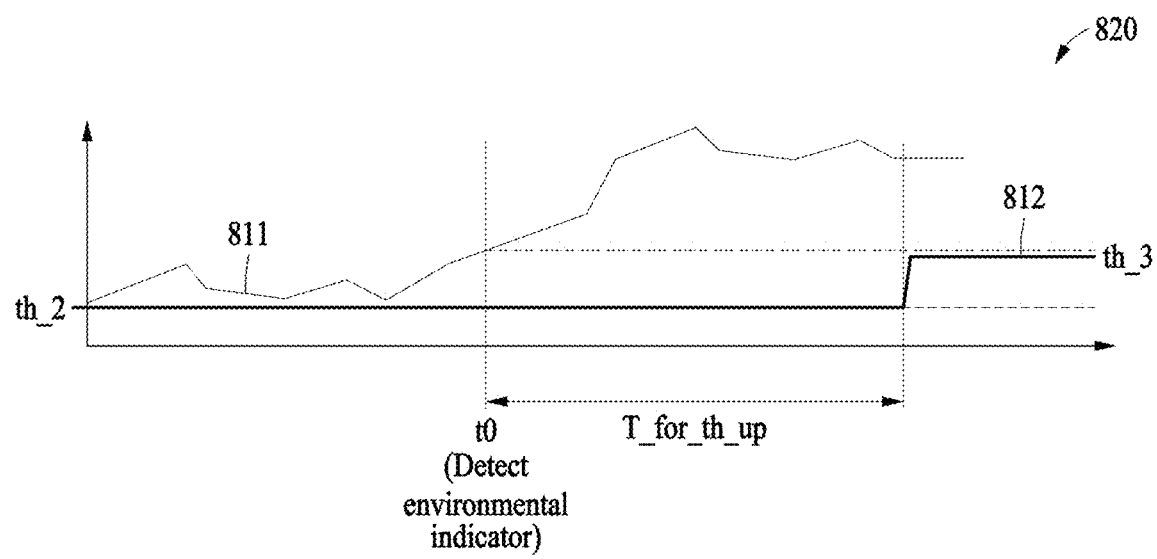
Figure 8C:
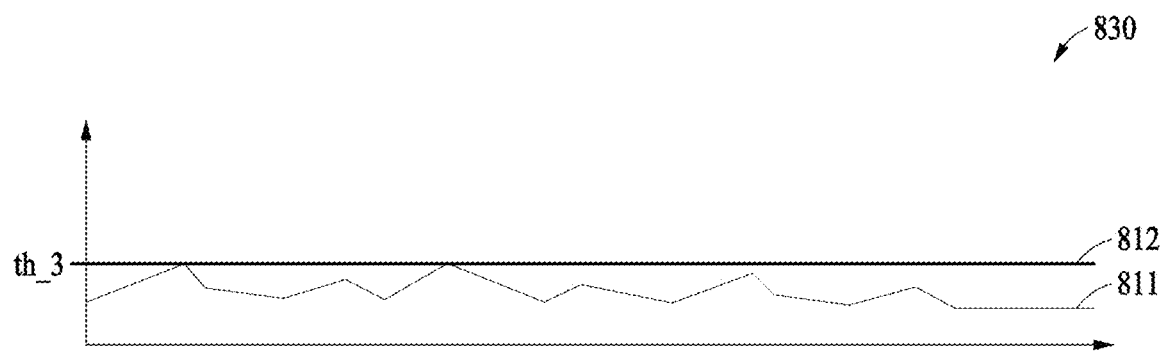

FIGS. 8A, 8B and 8C graphs illustrating example operations of adjusting a threshold based on environment recognition according to various example embodiments. Referring to FIG. 8A, graph 810 may represent similarity data 811 and a threshold 812. The similarity data 811 may have a second value th_2 through the operation of searching for the minimum threshold described with reference to FIG. 7. After searching for the minimum threshold, when there is no user motion due to a change in a surrounding environment and/or a change in a state (for example, degradation) of a wireless router (for example, the wireless router 120), the similarity data 811 may be maintained to be greater than the threshold. In this case, a motion may be detected even though there is no motion.

Referring to graph 820 of FIG. 8B, an environmental indicator may be detected at time t0, and the threshold 812 may be adjusted based on the similarity data 811 of a time period T_for_th_up in which the environmental indicator has appeared. In case the environment indicator is detected, a representative similarity value of the time period T_for_th_up in which the environmental indicator has appeared may be determined based on the similarity data 811, and the threshold 812 may be incrementally adjusted when the representative similarity value is greater than the threshold 812. For example, the representative similarity value may be a minimum similarity value of the time period T_for_th_up, and the threshold 812 may be adjusted to a value, that is, a third value th_3, between the minimum similarity value and the threshold 812 having the second value th_2. The minimum similarity value may be a minimum value of similarity values based on the similarity data 811 of the time period T_for_th_up.

The time period T_for_th_up may begin from time t0 or after a predetermined delay from the time t0. The time period T_for_th_up may have a predetermined time length. The time length of the time period T_for_th_up for adjusting the threshold and the time length of the time period T_for_th for searching for the minimum threshold may be independently set.

Referring to graph 830 of FIG. 8C, the threshold 812 may have the third value th_3 through threshold adjustment based on environment recognition. When there is a situation in which no motion has occurred, the similarity data 811 may be lower than the third value th_3. Accordingly, through threshold adjustment based on environment recognition, the situation in which there is no motion may be detected again. Thereafter, when a motion has occurred, the similarity data 811 may be greater than the third value th_3, and thus, the motion may be detected.

Figure 9:
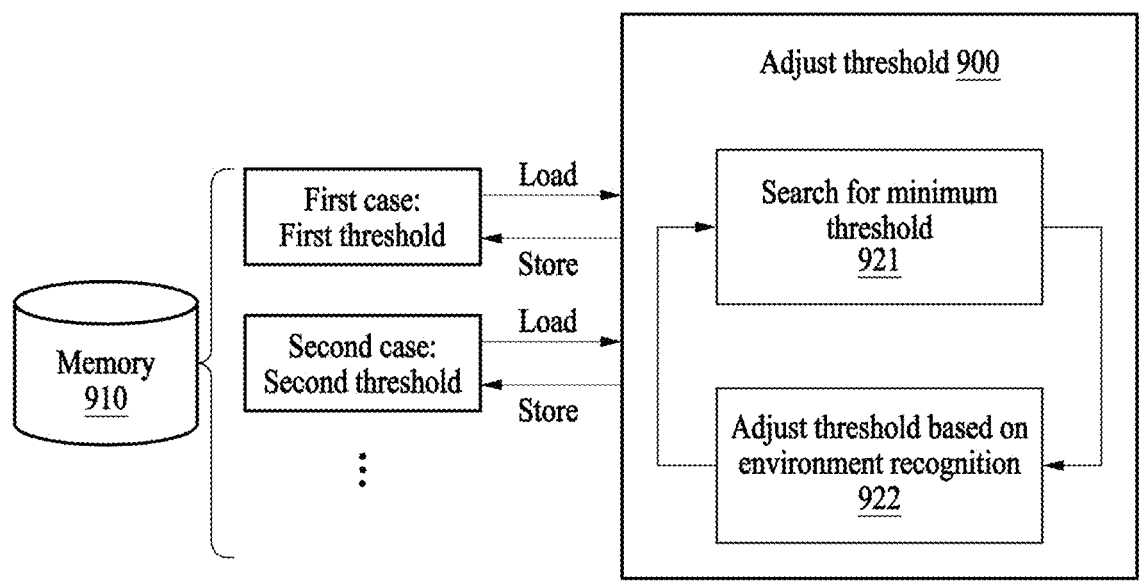
FIG. 9 is a diagram illustrating an example operating environment of thresholds for a plurality of cases according to various embodiments.

FIG. 9 is a diagram illustrating an example operating environment of thresholds in a plurality of cases according to various embodiments. A display device (for example, the display device 110, the display device 1200, and the display device 1300) may include a memory 910 (for example, a memory 1220 (refer to FIG. 12) and a memory 1320 (refer to FIG. 13)). The display device may store thresholds for a plurality of cases in the memory 910, and may use the thresholds by loading the thresholds according to a current case. The cases may correspond to different environments, respectively. For example, in a second case, a new electronic device may have a greater influence on similarity data, compared to a first case. For example, the second case may include a case in which a new electronic device (for example, an air conditioner, a fan, a washing machine) around the display device has turned on, and a case in which a new electronic device (for example, a robotic cleaner) approaches near the display device.

The display device may detect an influence by the new electronic device through communication (for example, Internet of Things (IoT)-based communication) with the new electronic device and/or detecting a sound event (for example, a unique sound when the power is on and/or operating noise) of the new electronic device. The influence by the new electronic device may be misrecognized as a motion of the user. The display device may reduce an error using different thresholds for each case. For example, the display device may not use the first threshold, which is used for the first case, for the second case through adjusting, and may use a second threshold for the second case by newly allocating the second threshold.

The display device may perform operation 900 of adjusting a threshold on the first threshold for the first case. When the second case has occurred by detecting the influence by the new electronic device, the display device may store the first threshold in the memory 910 by matching the first threshold to the first case, and may perform operation 900 on the second threshold by generating the second threshold for the second case. Operation 900 may include operation 921 of searching for a minimum threshold and operation 922 of adjusting a threshold based on environment recognition. When the first case occurs again as the influence by the new electronic device has removed and the second case is terminated, the display device may store the second threshold in the memory 910 by matching the second threshold to the second case, and may use the first threshold by loading the first threshold from the memory 910.

Figure 10:
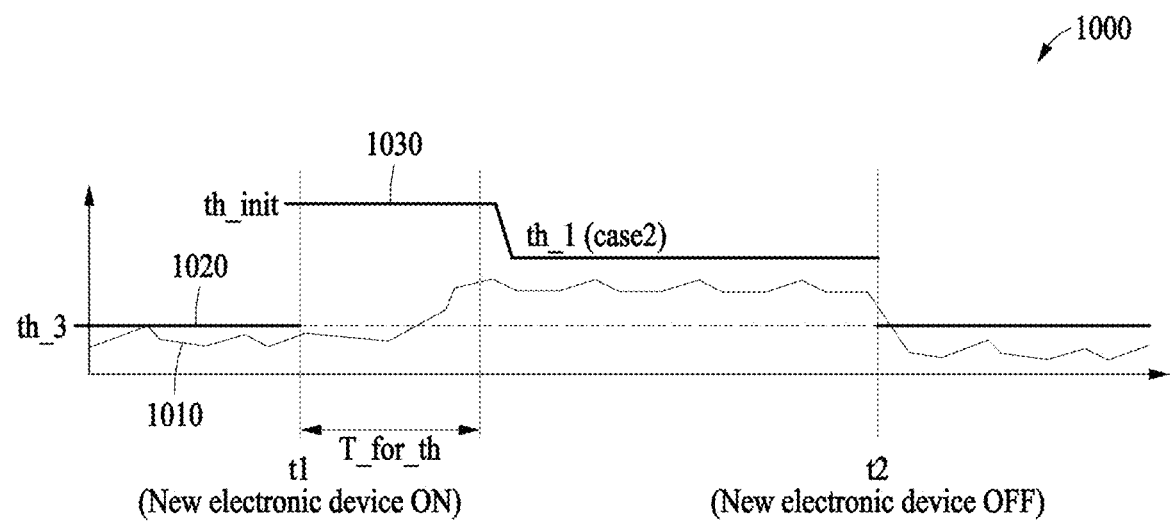
FIG. 10 is a graph illustrating an example operation of applying a threshold to each case according to various embodiments.

FIG. 10 is a graph illustrating an example operation of applying a threshold to a case according to various embodiments. Referring to graph 1000 of FIG. 10, a display device (for example, the display device 110, the display device 1200, and the display device 1300) may measure a motion of a user based on similarity data 1010 and a first threshold 1020 in a first case. The display device may detect that the power of a new electronic device has turned on at time t1. The display device may store, in a memory (for example, the memory 910, the memory 1220, and the memory 1320), a current value th_3 of the first threshold 1020 by matching the current value th_3 to the first case.

The display device may measure a motion using a second threshold 1030 in a second case in which an influence by the new electronic device is present. When the second threshold 1030 is stored in the memory, the display device may load and use the second threshold 1030, and when the second threshold 1030 is not in the memory, the display device may newly generate and use the second case and the second threshold 1030. FIG. 10 illustrates an example of the second case and the second threshold 1030, which are newly generated. The display device may adjust the second threshold 1030 through searching for the minimum threshold and/or threshold adjustment based on environment recognition. For example, the display device may adjust an initial value th_init of the second threshold 1030 to a first value th_1 (case2) by searching for the minimum threshold for the time period T_for_th.

Figure 11:
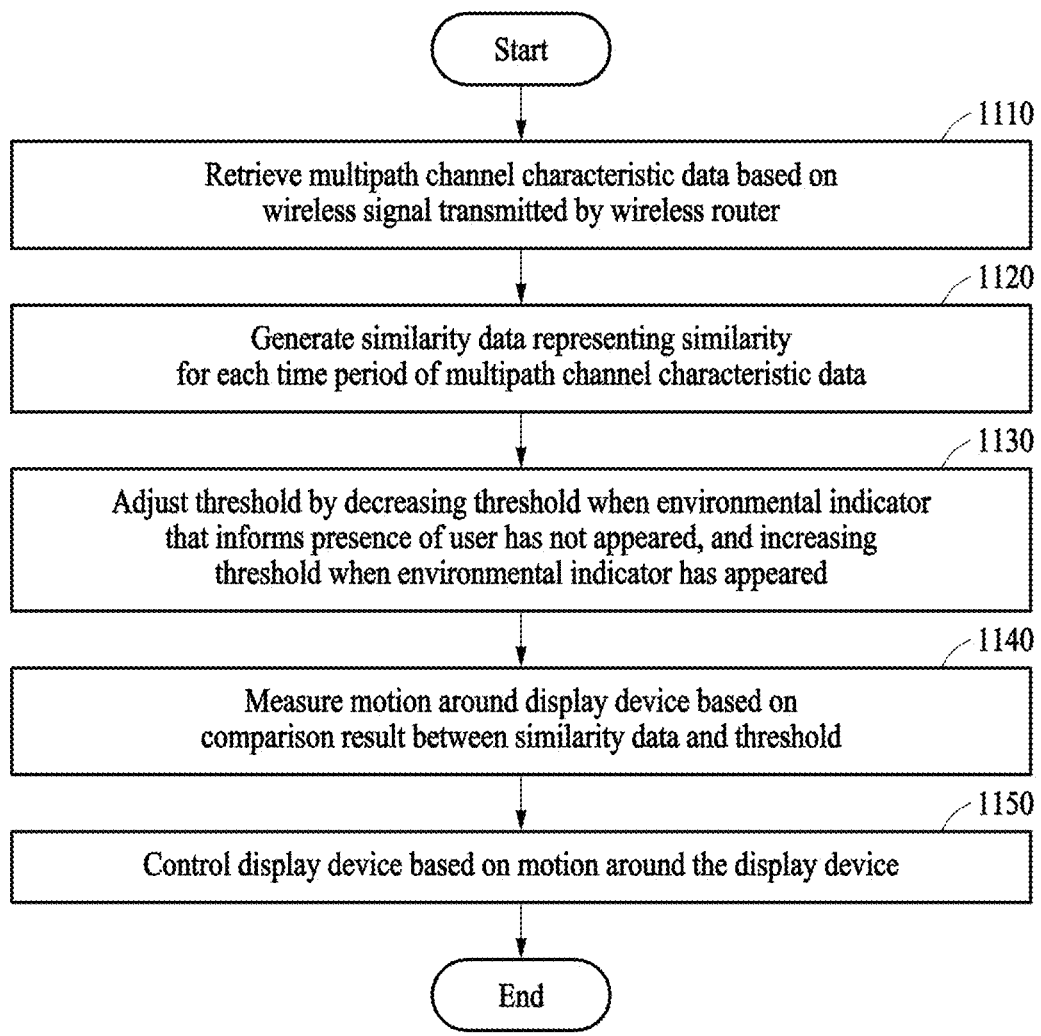
FIG. 11 is a flowchart illustrating an example method of controlling a display device, according to various embodiments.

The display device may detect that the power of the new electronic device is turned off at time t2. The display device may store the current value th_1 (case2) of the second threshold 1030 in the memory by matching the current value th_1 to the second case, and may load a recent value th_3 of the first threshold 1020 from the memory and use the recent value th_3. FIG. 11 is a flowchart illustrating an example method of controlling a display device, according to various embodiments. Operations 1110 to 1150 of FIG. 11 may be performed sequentially or non-sequentially. For example, the order of operations 1110 to 1150 may change, and/or at least two of operations 1110 to 1150 may be performed in parallel. Operations 1110 to 1150 may be performed by at least one component (for example, a processor 1230 and a processor 1330) of a display device (for example, the display device 110, the display device 1200, and the display device 1300).

Referring to FIG. 11, in operation 1110, the display device may retrieve multipath channel characteristic data based on a wireless signal transmitted by a wireless router, and in operation 1120, the display device may generate similarity data representing a similarity for each time period of the multipath channel characteristic data.

In operation 1130, the display device may adjust a threshold based on the similarity data, and by increasing the threshold when the environmental indicator has appeared. The display device may decrease the threshold based on the similarity data in case an environmental indicator that indicates a presence of a user has not appeared, and increase the threshold based on the similarity data in case the environmental indicator has appeared. The environmental indicator may represent physical manipulation by the user, and may include at least one of a remote controller signal, an acceleration sensor signal, an IR signal, a UWB signal, input speech, and additional physical connection.

Operation 1130 may include an operation of determining a representative similarity value of a first time period in which the environmental indicator has not appeared based on the similarity data, and an operation of decreasing the threshold to a value between the representative similarity value and the threshold when the representative similarity value is less than the threshold. The representative similarity value may be an average similarity value, a median similarity value, and a sampled similarity value of the first time period.

Operation 1130 may include an operation of detecting the environmental indicator, an operation of determining a minimum similarity value of a second time period in which the environmental indicator, and an operation of increasing the threshold to a value between the minimum similarity value and the threshold when the minimum similarity value is greater than the threshold.

Operation 1130 may include an operation of generating a second case using a second threshold, instead of the threshold when an influence by a new electronic device has been detected, an operation of storing the threshold as a first case, and an operation of adjusting the second threshold considering the influence by the new electronic device. A motion around the display device may be measured based on the second threshold. Operation 1130 may include an operation of loading the threshold of the first case when the influence by the new electronic device has removed, and an operation of adjusting the threshold based on similarity data. The motion around the display device may be measured based on the threshold.

In operation 1140, the display device may measure a motion around the display device based on a comparison result between the similarity data and the threshold. In operation 1150, the display device may control the display device based on the motion around the display device.

Figure 12:
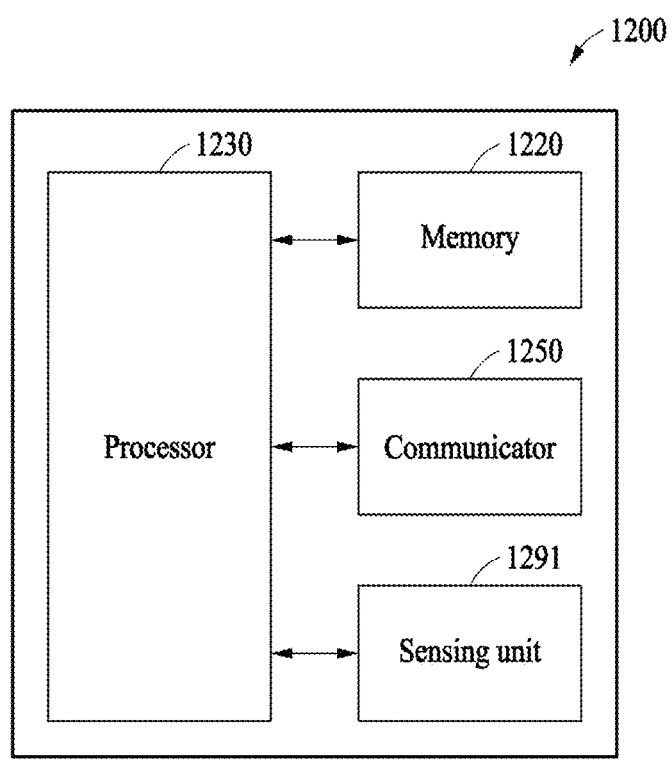
FIGS. 12 and 13 are block diagrams illustrating example configurations of a display device according to various embodiments.
Figure 13:
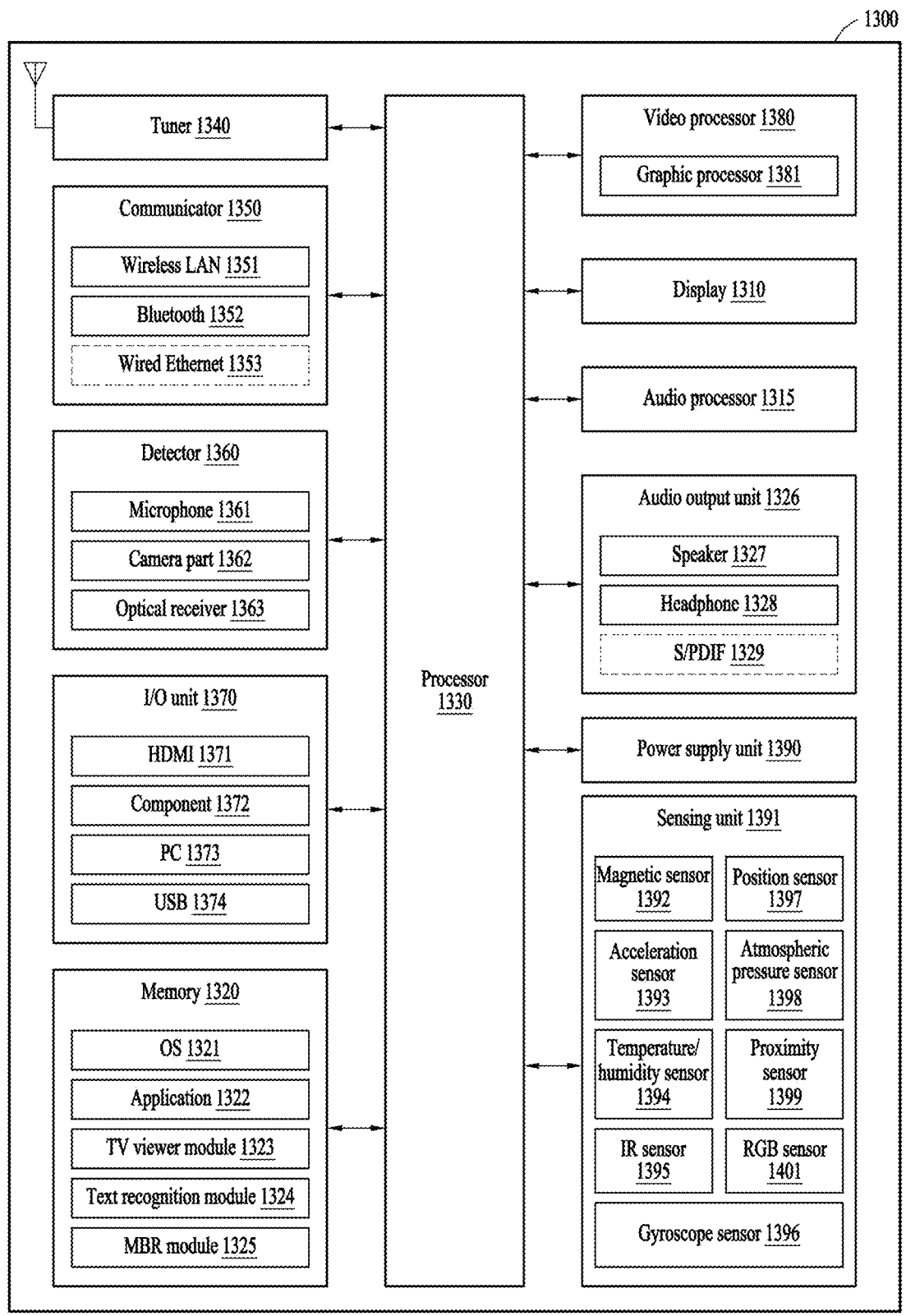

FIGS. 12 and 13 are block diagrams illustrating example configurations of a display device according to various embodiments. As shown in FIG. 12, the display device 1200 may include the memory 1220, the processor (e.g., including processing circuitry) 1230, a communicator (e.g., including communication circuitry) 1250, and a sensing unit (e.g., including sensing circuitry) 1291. The communicator 1250 may include various communication circuitry and receive a wireless signal transmitted by a wireless router. The processor 1230 may include various processing circuitry and retrieve multipath channel characteristic data based on the wireless signal, may generate similarity data representing a similarity by a time period of the multipath channel characteristic data, may adjust a threshold based on the similarity data, may measure a motion around the display device 1200 based on a comparison result between the similarity data and the threshold, and may control the display device 1200 based on the motion around the display device 1200.

The processor 1230 may decrease the threshold based on the similarity data in case an environmental indicator that indicates a presence of a user has not appeared, and increase the threshold based on the similarity data in case the environmental indicator has appeared.

The environmental indicator may represent physical manipulation by the user, and may include at least one of a remote controller signal, an acceleration sensor signal, an IR signal, a UWB signal, input speech, and additional physical connection. The processor 1230 may determine a representative similarity value of a first time period in which the environmental indicator has not appeared, based on the similarity data, and may decrease the threshold when the representative similarity value is less than the threshold. The representative similarity value may be an average similarity value, a median similarity value, and a sampled similarity value of the first time period. The processor 1230 may adjust the threshold to a value between a maximum similarity value of the first time period and the threshold.

The processor 1230 may detect the environmental indicator, may determine a representative similarity value of a second time period in which the environmental indicator has appeared based on the similarity data, and may increase the threshold when the representative similarity value is greater than the threshold. The representative similarity value may be a minimum similarity value of the second time period, and the processor 1230 may adjust the threshold to a value between the minimum similarity value and the threshold.

When an influence by a new electronic device is detected, the processor 1230 may generate a second case that uses a second threshold, instead of the threshold, may store the threshold as the first case, may adjust the second threshold considering the influence by the new electronic device, and may measure a motion around the display device based on the second threshold. When the influence by the new electronic device has removed, the processor 1230 may load the threshold of the first case, may adjust the threshold based on the similarity data, and may measure a motion around the display device based on the threshold.

The processor 1230 may determine amplitude data including an amplitude value for each frequency of a subcarrier based on the multipath channel characteristic data, may determine a representative value for each reference time by calculating a similarity based on the amplitude data, and may generate the similarity data based on the representative values. The processor 1230 may determine a first similarity value of a first frequency at a W+1-th time point by calculating a similarity between first amplitude data of the first frequency at a first time point to a W-th time point within a first window of the multipath channel characteristic data and second amplitude data of the first frequency at a second time point to the W+1-th time point within a second window, and may determine a representative similarity value at the W+1-th time point, based on the first similarity value of the first frequency at the W+1-th time point and a second similarity value of a second frequency at the W+1-th time point.

The processor 1230 may retrieve multipath channel characteristic data based on the wireless signal transmitted by a wireless router, may generate similarity data representing a similarity by a time period of the multipath channel characteristic data, may adjust a threshold based on the similarity data, may measure a motion around the display device based on a comparison result between the similarity data and the threshold, and may control the display device based on the motion around the display device. The environmental indicator may indicate physical manipulation by a user.

Not all components shown in FIG. 12 are essential components. The display device 1200 may be implemented by more components than the illustrated components, and the display device 1200 may be implemented by less components.

For example, as shown in FIG. 13, the display device 1300 may include a display 1310, a tuner 1340, a detector (e.g., including detecting circuitry) 1360, an input/output (I/O) unit (e.g., including input/output circuitry) 1370, a video processor (e.g., including video processing circuitry) 1380, an audio processor (e.g., including audio processing circuitry) 1315, an audio output unit (e.g., including audio output circuitry) 1326, and a power supply unit (e.g., including a power supply) 1390 as well as the memory 1320, the processor (e.g., including processing circuitry) 1330, a communicator (e.g., including communication circuitry) 1350, and a sensing unit (e.g., including at least one sensor) 1391.

Hereinafter, the components stated above are described.

The processor 1330 may include various processing circuitry and control general operations of the display device 1300 and a flow of a signal between internal components of the display device 1300, and may process data. The processor 1330 may execute various applications and an operation system (OS) stored in the memory 1320, in response to a user input or when a preset and stored condition is satisfied.

The processor 1330 may include random access memory (RAM) configured to store data or a signal input from the outside the display device 1300 or configured to be used as a storage corresponding to various tasks performed by the display device 1300, read-only memory (ROM) that stores a control program to control the display device 1300, and a processor.

The processor 1330 may include a graphics processing unit (GPU) (not shown) to process a graphic corresponding to a video. The processor 1330 may be implemented as a System on Chip (SoC) that integrates a core (not shown) and the GPU (not shown). The processor 1330 may include a single core, a dual core, a triple core, a quad core, and a multi core.

The processor 1330 may include a plurality of processors. For example, the processor 1330 may be implemented as a main processor (not shown) and a sub-processor (not shown) that operates in a sleep mode.

The processor 1330 may detect at least one sensed value corresponding to at least one sensor through the sensing unit 1391 including at least one sensor, by executing one or more instructions stored in the memory 1320.

The memory 1320 may store various pieces of data, a program, or an application for driving and controlling the display device 1300 under control by the processor 1330. The memory 1320 may store data or input/output signals corresponding to driving of the video processor 1380, the display 1310, the audio processor 1315, the audio output unit 1326, the power supply unit 1390, the tuner 1340, the communicator 1350, the detector 1360, and the I/O unit 1370.

The memory 1320 may store an operating system 1321 for controlling the display device 1300 and the processor 1330, an application 1322 initially provided by a manufacturer or externally downloaded, a graphical user interface (GUI) related to the application, an object (for example, an image, text, an icon, a button, and the like) for providing the GUI, user information, a document, a database, and related data.

In addition, the memory 1320 may include a television (TV) viewer module 1323 including one or more instructions to receive an input signal from a remote control device (not shown) and thereby perform channel control corresponding to the input signal, or enter a channel scroll user interface mode when the input signal corresponds to a preset input, a text recognition module 1324 including one or more instructions to recognize information from content received from an external device (not shown), and a memory buffer register (MBR) module 1325 including one or more instructions to control a channel from an external device (not shown).

The memory 1320 may include ROM, RAM, a memory card (for example, a micro secure digital (SD) card and a universal serial bus (USB) memory, which are not shown) mounted to the display device 1300. In addition, the memory 1320 may include non-volatile memory, volatile memory, a hard disk drive (HDD), or a solid state drive (SSD).

The memory 1320 may include at least one type of storage media of a flash memory type, a hard disk type, a multimedia card micro type, a card-type memory (for example, SD or extreme digital (XE) memory), RAM, static RAM, ROM, electrically erasable programmable ROM (EEPROM), programmable ROM (PROM), magnetic memory, a magnetic disk, and an optical disk.

The display 1310 may display a video included in a broadcast signal received through the tuner 1340 on a screen under control by the processor 1330. In addition, the display 1310 may display content (for example, a moving image) input through the communicator 1350 or the I/O unit 1370. The display 1310 may output an image stored in the memory 1320 under control by the processor 1330.

The display 1310 may generate a driving signal by converting an image signal, a data signal, an on-screen display (OSD) signal, and a control signal processed by the processor 1330. The display 1310 may be implemented as a plasma display panel (PDP), a liquid crystal display (LCD), an organic light-emitting diode (OLED), a cathode ray tube (CRT), and a flexible display, and in addition the display 1310 may be implemented as a 3D display. In addition, the display 1310 may be used as an input device as well as an output device by being configured as a touchscreen.

The tuner 1340 may tune and select a frequency of a channel desired to be received by the display device 1300 among various radio wave elements through performing amplification, mixing, and resonance on a broadcast signal that is received by wire or wirelessly. The broadcast signal may include audio, video, and additional information (for example, an electronic program guide (EPG)).

The tuner 1340 may receive the broadcast signal from a frequency band corresponding to a channel number according to a user input (for example, a control signal received from a remote control device (not shown), that is, a channel number input, an up-down input of a channel, and a channel input on an EPG screen).

The tuner 1340 may receive broadcast signals from various sources, such as terrestrial broadcast, cable broadcast, satellite broadcast, and Internet broadcast. The tuner 1340 may receive the broadcast signal from a source, such as analog broadcast or digital broadcast. The broadcast signal received by the tuner 1340 may be separated into audio, video, and/or additional information by decoding (for example, audio decoding, video decoding, or additional information decoding). The separated audio, video, and/or additional information may be stored in the memory 1320 under control by the processor 1330.

One or a plurality of tuners 1340 of the display device 1300 may be provided. The tuner 1340 may be implemented as all-in-one with the display device 1300, or implemented as a separate device (for example, a set-top box, which is not shown, and a tuner, which is not shown, connected to the I/O unit 1370) that includes a tuner electrically connected to the display device 1300.

The communicator 1350 may include various communication circuitry and connect the display device 1300 to an external device (for example, an audio device) (not shown) under control by the processor 1330. The processor 1330 may transmit/receive content to/from the external device (not shown) connected through the communicator 1350, may download an application from the external device (not shown), or may perform web browsing. The communicator 1350 may include one of a wireless local area network (LAN) 1351, Bluetooth 1352, and wired Ethernet 1353 corresponding to the performance and the structure of the display device 1300. In addition, the communicator 1350 may include a combination of the wireless LAN 1351, Bluetooth 1352, and the wired Ethernet 1353.

In addition, the communicator 1350 may receive a control signal of a remote control device (not shown) under control by the processor 1330. The control signal may be implemented as a Bluetooth type, a radio frequency (RF) signal type, or a Wi-Fi type.

In addition, the communicator 1350 may further include another local area communication (for example, near field communication (NFC), which is not shown, and Bluetooth low energy (BLE), which is not shown) other than Bluetooth.

The detector 1360 may include various detecting circuitry and detect voice, an image, or an interaction of a user, and may include a microphone 1361, a camera part 1362, and an optical receiver 1363.

The microphone 1361 may receive an uttered voice of the user. The microphone 1361 may convert the received voice into an electrical signal and may output the electrical signal to the processor 1330. The user voice may include, for example, voice corresponding to a menu or a function of the display device 1300.

The camera part 1362 may obtain an image bezel such as a still image or a moving image. An image captured by an image sensor may be processed by the processor 1330 or a separate image processor (not shown).

The image bezel processed by the camera part 1362 may be stored in the memory 1320 or may be transmitted to the outside through the communicator 1350. Two or more camera parts 1362 may be provided based on the configuration of the display device 1300.

The optical receiver 1363 may receive an optical signal (including a control signal) received from an external remote control device (not shown). The optical receiver 1363 may receive an optical signal corresponding to a user input (for example, a touch, a press, a touch gesture, a voice, or a motion) from a remote control device (not shown). A control signal may be extracted from the received optical signal under control by the processor 1330. For example, the optical receiver 1363 may receive a control signal corresponding to a channel up/down button for changing a channel, from the remote control device (not shown).

The I/O unit 1370 may include various I/O circuitry and receive video (for example, a moving image), audio (for example, voice, music), and additional information (for example, an EPG) from the outside of the display device 1300 under control by the processor 1330. The I/O unit 1370 may include at least one of a high-definition multimedia interface (HDMI) port 1371, a component jack 1372, a PC port 1373, and a USB port 1374. The I/O unit 1370 may include any combination of the HDMI port 1371, the component jack 1372, the PC port 1373, and the USB port 1374. An external image providing device (not shown) may be connected through the HDMI port 1371.

The video processor 1380 may include various video processing circuitry and process video data received by the display device 1300. In the video processor 1380, various image processing may be performed on video data, such as decoding, scaling, noise filtering, bezel rate conversion, and resolution conversion.

A graphic processor 1381 may generate a screen including various objects, such as an icon, an image, and text, using an arithmetic unit (not shown) and a renderer (not shown). The arithmetic unit (not shown) may calculate an attribute value, such as a color, a size, a shape, a coordinate value, to display each object based on a layout of a screen using a user input that is detected by the detector 1360. The renderer (not shown) may generate screens in various layouts including an object, based on the attribute value calculated by the arithmetic unit (not shown). The screen generated by the renderer (not shown) may be displayed on a display area of the display 1310.

The audio processor 1315 may include various audio processing circuitry and process audio data. The audio processor 1315 may perform various processing on the audio data, such as decoding, amplification, and noise filtering. Meanwhile, the audio processor 1315 may include a plurality of audio processing modules to process audio corresponding to a plurality of contents.

The audio output unit 1326 may include various audio output circuitry and output audio included in the broadcast signal received through the tuner 1340 under control by the processor 1330. The audio output unit 1326 may output audio (for example, voice, sound) input through the communicator 1350 or the I/O unit 1370. In addition, the audio output unit 1326 may output audio stored in the memory 1320 under control by the processor 1330. The audio output unit 1326 may include at least one of a speaker 1327, a headphone output terminal 1328, or a Sony/Philips digital interface (S/PDIF) output terminal 1329. The audio output unit 1326 may include any combination of the speaker 1327, the headphone output terminal 1328, and the S/PDIF output terminal 1329.

The power supply unit 1390 may include a power supply and supply power input from an external power source to the components inside the display device 1300 under control by the processor 1330. In addition, the power supply unit 1390 may supply power output from one or more batteries (not shown) placed inside the display device 1300 to the components inside the display device 1300 under control by the processor 1330.

The sensing unit 1391 may include at least one sensor and sense a state of the display device 1300 or a state around the display device 1300, and may provide the information obtained by sensing to the processor 1330.

The sensing unit 1391 may include at least one of a magnetic sensor 1392, an acceleration sensor 1393, a temperature/humidity sensor 1394, an IR sensor 1395, a gyroscope sensor 1396, a position sensor (for example, global positioning system (GPS)) 1397, an atmospheric pressure sensor 1398, a proximity sensor 1399, and an RGB sensor 1401 (for example, an illuminance sensor), however, the example is not limited thereto. Since one skilled in the art may intuitively infer a function of each sensor from its name, a detailed description thereof may not be provided.

The sensing unit 1391 may sense an external impact applied to the display device 1300. In addition, a separate external device (for example, a set-top box, which is not shown) including the tuner 1340 may be electrically connected to the display device 1300 including the display 1310.

In addition, the display device 1300 may be implemented as an analog TV, a digital TV, a 3D-TV, a smart TV, an LED TV, an OLED TV, a plasma TV, and a monitor, however, one skilled in the art will understand that the example is not limited thereto.

Meanwhile, the illustrated block diagram of the display device 1300 is a block diagram for an example embodiment. Each component of the block diagram may be integrated, added, or omitted based on actually implemented specifications of the display device 1300. For example, two or more components may be combined into one component, or one component may be divided into two or more components, as necessary. In addition, a function performed by each block is for describing example embodiments, and a detailed operation thereof or a device does not limit the scope of the present disclosure.

It should be understood that various example embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and may refer to components in other aspects (e.g., importance or order) is not limited. It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various example embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (for example, the OS 1321, the application 1322) including one or more instructions that are stored in a storage medium (for example, the memory 1220, the memory 1320) that is readable by a machine (for example, the display device 110, the display device 1200, and the display device 1300). For example, a processor (for example, the processor 1230, the processor 1330) of the machine (for example, the display device 110, the display device 1200, and the display device 1300) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components or operations may be omitted, or one or more other components or operations may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A display device comprising:
   a communicator comprising communication circuitry configured to receive a wireless signal transmitted by a wireless router; and
   at least one processor, individually and/or collectively configured to:
   retrieve multipath channel characteristic data based on the wireless signal,
   generate similarity data representing a similarity for each time period of the multipath channel characteristic data,
   adjust a threshold based on the similarity data by decreasing the threshold based on the similarity data in case an environmental indicator that indicates a presence of a user has not appeared, and increasing the threshold based on the similarity data in case the environmental indicator has appeared,
   measure a motion within a specified range of the display device based on a comparison result between the similarity data and the threshold, and
   control the display device based on the motion within a specified range of the display device.

2. The display device of claim 1, wherein the generated similarity data represents a similarity for each time period and for each subcarrier, and decreasing the threshold includes decreasing the threshold to a value between the threshold and a minimum similarity value of similarity values in a time period of the multipath channel characteristic data that the presence of the user has not appeared.

3. The display device of claim 1, wherein the environmental indicator indicates physical manipulation by the user and comprises at least one of a remote controller signal, an acceleration sensor signal, an infrared ray (IR) signal, an ultrawide band (UWB) signal, input speech, and additional physical connection.

4. The display device of claim 1, wherein the at least one processor is individually and/or collectively configured to:
   determine a representative similarity value of a first time period in which the environmental indicator has not appeared, based on the similarity data, and
   decrease the threshold based on the representative similarity value being less than the threshold.

5. The display device of claim 4, wherein the representative similarity value is an average value, a median value, or a sampled similarity value of the first time period, and
   the at least one processor is individually and/or collectively configured to adjust the threshold to a value between the threshold and a maximum similarity value of the first time period.

6. The display device of claim 1, wherein the at least one processor is individually and/or collectively configured to:
   detect the environmental indicator,
   determine a representative similarity value of a second time period in which the environmental indicator has appeared, based on the similarity data, and
   increase the threshold based on the representative similarity value being greater than the threshold.

7. The display device of claim 6, wherein the representative similarity value is a minimum similarity value of the second time period, and
   the at least one processor is individually and/or collectively configured to adjust the threshold to a value between the minimum similarity value and the threshold.

8. The display device of claim 1, wherein the at least one processor is individually and/or collectively configured to:
   based on an influence by a new electronic device being detected, generate a second case that uses a second threshold, instead of the threshold,
   store the threshold as a first case,
   adjust the second threshold based on the influence by the new electronic device, and
   measure the motion within a specified range of the display device based on the second threshold.

9. The display device of claim 8, wherein the at least one processor is individually and/or collectively configured to:
   based on the influence by the new electronic device being removed, load the threshold of the first case,
   adjust the threshold based on the similarity data, and
   measure the motion within a specified range of the display device based on the threshold.

10. The display device of claim 1, wherein the at least one processor is individually and/or collectively configured to:
    determine amplitude data comprising an amplitude value by a frequency of a subcarrier based on the multipath channel characteristic data,
    determine representative values by reference times, by calculating similarities based on the amplitude data, and
    generate the similarity data based on the representative values.

11. The display device of claim 10, wherein the at least one processor is individually and/or collectively configured to:
    determine a first similarity value of a first frequency at a W+1-th time point by calculating a similarity between first amplitude data of the first frequency at a first time point to a W-th time point within a first window of the multipath channel characteristic data and second amplitude data of the first frequency at a second time point to the W+1-th time point within a second window, and
    determine a representative similarity value at the W+1-th time point, based on the first similarity value of the first frequency at the W+1-th time point and a second similarity value of a second frequency at the W+1-th time point.

12. A display device comprising:
    at least one processor; and
    a memory configured to store instructions executable by the at least one processor,
    wherein, in response to the instructions being executed by the at least one processor, the at least one processor is individually and/or collectively configured to:
    retrieve multipath channel characteristic data based on a wireless signal transmitted by a wireless router,
    generate similarity data representing a similarity for each time period of the multipath channel characteristic data,
    adjust a threshold by decreasing the threshold based on the similarity data based on an environmental indicator indicating a presence of a user not having appeared and increasing the threshold based on the similarity data based on the environmental indicator having appeared,
    measure a motion within a specified range of the display device based on a comparison result between the similarity data and the threshold, and
    control the display device based on the motion within a specified range the display device,
    wherein the environmental indicator indicates physical manipulation by the user.

13. The display device of claim 12, wherein the at least one processor is individually and/or collectively configured to:
    decrease the threshold based on the similarity data in case an environmental indicator that indicates a presence of a user has not appeared, and increase the threshold based on the similarity data in case the environmental indicator has appeared.

14. The display device of claim 13, wherein the at least one processor is individually and/or collectively configured to:
    determine a representative similarity value of a first time period in which the environmental indicator has not appeared, based on the similarity data, and
    decrease the threshold based on the representative similarity value being less than the threshold.

15. The display device of claim 13, wherein the at least one processor is individually and/or collectively configured to:
    detect the environmental indicator,
    determine a representative similarity value of a second time period in which the environmental indicator has appeared, based on the similarity data, and
    increase the threshold based on the representative similarity value being greater than the threshold.

16. A method of controlling a display device, the method comprising:
    retrieving multipath channel characteristic data based on a wireless signal transmitted by a wireless router;
    generating similarity data representing a similarity for each time period of the multipath channel characteristic data;
    adjusting a threshold based on the similarity data by decreasing the threshold based on the similarity data in case an environmental indicator that indicates a presence of a user has not appeared, and increasing the threshold based on the similarity data in case the environmental indicator has appeared; and
    controlling the display device based on the motion within a specified range of the display device.

17. The method of claim 16, wherein the generated similarity data represents a similarity for each time period and for each subcarrier, and decreasing the threshold includes decreasing the threshold to a value between the threshold and a minimum similarity value of similarity values in a time period of the multipath channel characteristic data that the presence of the user has not appeared.

18. The method of claim 16, wherein the environmental indicator indicates physical manipulation by the user and comprises at least one of a remote controller signal, an acceleration sensor signal, an infrared ray (IR) signal, an ultrawide band (UWB) signal, input speech, and additional physical connection.

19. The method of claim 16, wherein the adjusting of the threshold comprises:
- determining a representative similarity value of a first time period in which the environmental indicator has not appeared, based on the similarity data; and
- decrease the threshold to a value between the representative similarity value and the threshold based on the representative similarity value being less than the threshold,
- wherein the representative similarity value is an average value, a median value, or a sampled similarity value of the first time period.

20. A non-transitory computer-readable storage medium storing instructions that, when executed by at least one processor individually and/or collectively, cause the at least one processor to perform the operations of claim 16.

* * * * *